United States Patent [19]
Hopkins

[11] 4,211,510
[45] Jul. 8, 1980

[54] ADJUSTABLE BORING HEAD
[75] Inventor: David A. Hopkins, Troy, Mich.
[73] Assignee: The Valeron Corporation, Oak Park, Mich.
[21] Appl. No.: 939,444
[22] Filed: Sep. 5, 1978
[51] Int. Cl.² ............................................. B23B 31/04
[52] U.S. Cl. .................................. 408/186; 408/150; 408/197; 408/239 R; 279/6; 279/41 R; 279/103; 407/45; 407/78; 407/91
[58] Field of Search ............... 408/150, 151, 187, 188, 408/191, 197, 238, 239 R, 240, 186; 279/6, 1 A, 41, 44, 93, 83, 18, 45, 1 TE, 103; 407/90, 91, 45, 78

[56] References Cited
U.S. PATENT DOCUMENTS

| | | | |
|---|---|---|---|
| 412,439 | 10/1889 | Webster | 279/41 |
| 2,289,069 | 7/1942 | Radermacher | 408/188 |
| 2,643,556 | 6/1953 | Briney, Jr. | 408/150 |
| 2,729,991 | 1/1956 | Peterman | 408/150 |
| 3,281,170 | 10/1966 | Kaplan | 279/41 |

FOREIGN PATENT DOCUMENTS

| | | | |
|---|---|---|---|
| 11590 | of 1914 | United Kingdom | 279/6 |
| 598240 | 2/1948 | United Kingdom | 408/239 R |

*Primary Examiner*—Leonidas Vlachos

[57] ABSTRACT

An adjustable boring tool including an axial shank and a socket for mounting a cylindrical boring bar with an offset axis clamped in adjustable position through transverse and longitudinally slotted segments on one side of the socket together with a transverse screw for clamping the slotted segments against the boring bar. A graduated dial fixed to the boring bar provides calibrated adjustment over a range equal to four times the offset.

9 Claims, 4 Drawing Figures

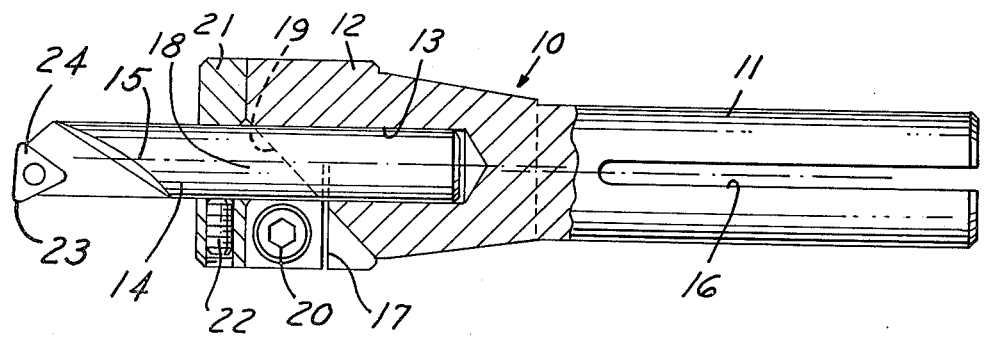
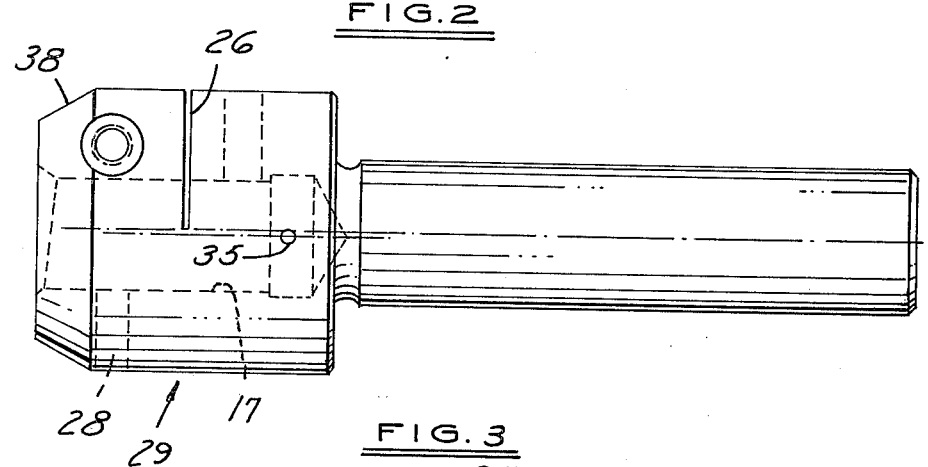
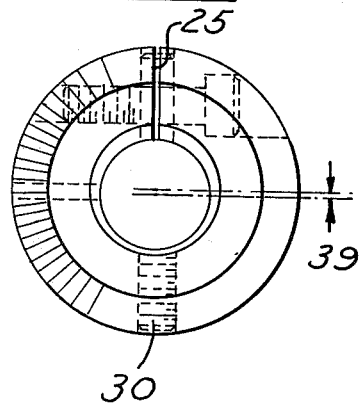

ADJUSTABLE BORING HEAD

BACKGROUND OF THE INVENTION

Adjustable boring bars employing an offset principal are known in the art usually employing an intermediate eccentric sleeve interposed between the boring bar and head of the tool with somewhat complex manufacturing provisions for achieving accuracy. Also a tool is disclosed in U.S. Pat. No. 2,643,556 wherein a conical offset socket seats a conically tapered boring bar which is clamped against rotation after adjustment under axial spring loading by a keyed split nut threaded on the inner end of the conical boring bar adapted to react against a plurality of springs seated in the socket.

Another example of the closest known prior art is an eccentrically mounted boring head disclosed in U.S. Pat. No. 2,931,254 wherein preloaded balls are employed to facilitate rotational adjustment under axial spring loaded frictional shoulder engagement relied upon for retaining the boring bar in adjusted position.

In U.S. Pat. No. 4,022,539 a discreet adjustment is achieved with interengaging splined elements retaining the boring bar in rotationally adjusted position.

SUMMARY OF THE PRESENT INVENTION

The present invention provides a simplified combination of offset cylindrical socket and boring bar with clamping provided by transverse and longitudinal slots extending respectively to the center line of the socket and longitudinally through one side to the transverse slot defining two quadrant socket walls which may be deflected through tightening of the transverse clamp screw against an adjusted boring bar forcing it into clamped engagement with the opposite bore wall of the socket. A calibrated ring detachably secured to the boring bar in juxtaposition with an indicia mark at the end of the socket permits accurate adjustment of the effective diameter of the cutting point through rotation of the boring bar with the clamp screw loosened providing an effective adjustment over a range equal to four times the offset. The calibrated ring may be readily removed from one boring bar and secured to another so that a set of boring bars covering a substantial range of sizes may be readily provided in a most economical way.

BRIEF DESCRIPTION OF THE DRAWINGS

FIG. 1 is a partially sectioned side elevation of an adjustable offset boring tool in accordance with the present invention including a boring bar assembled in a boring head;

FIG. 2 is a somewhat modified side elevation of a boring head per se;

FIG. 3 is an end view of the boring head of FIG. 2;

With reference to FIG. 1 the boring tool of the present invention comprises a boring head 10 including a shank 11 terminating in a socket 12 having a cylindrical bore 13 for receiving a cylindrical boring bar 14, the axis 15 of the cylindrical bore 13 and boring bar 14 is offset a predetermined amount from the axis 16 of the shank which is adapted for mounting in a rotatable machine spindle or otherwise for workpiece boring. The head 12 is provided with a transverse slot 17 extending substantially to the center line of the bore 13 and an intersecting diagonal slot 18 extending in the plane of the sectional view terminating along a diagonal line 19 which extends just deep enough to separate the split halves of the socket to the point where the slot 17 intersects without extending into the socket wall at the opposite forward end. The slot 18 need not extend axially inwardly of the slot 17 for functional purposes and is cut on a diagonal line solely for manufacturing convenience. A clamp screw 20 extends through one half of the split socket into a threaded hole in the other half, as best illustrated in the modification of FIGS. 2 and 3, and serves under tightened deflection to force the boring bar against the solid opposite wall of the bore 13 in the socket head 12.

Figure 4:
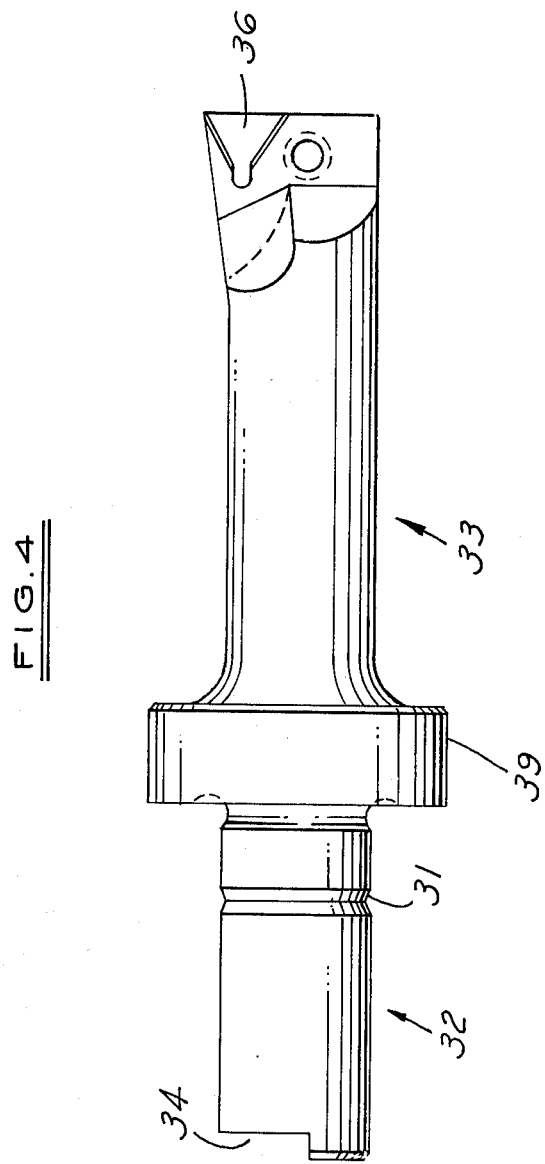
FIG. 4 is a side elevation of a boring bar adapted for installation in the boring head of FIGS. 2 and 3.

A calibrated dial collar 21 is retained in fixed position on the boring bar 14 by a set screw 22 and serves with an indicia mark on the boring head 12 to indicate the adjustable radial position of the cutting point 23 of an indexable insert 24 seated in a pocket at the nose of the boring bar 14. Loosening of the screw 20 permits rotation of the boring bar which, due to the offset of its axis 15 from the axis 16 of the shank 11 provides a range of adjustment equal to four times the offset. Thus, for example, with a relative axis offset of 0.018" the radial adjustment of the cutting point 23 relative to the shank axis 16 will equal 0.036" and adjustment in the total diameter of the boring bar will equal 0.072".

The amount of offset in total range of adjustment may of course be chosen to meet the requirements of accuracy for the boring tool and, particularly in view of the simple two-piece construction, it is contemplated that boring tool sets may be economically provided for a substantial range of bore sizes. As a practical example with a compliment of six boring bars having 1/16" diameter increments and a boring head having an 0.018" offset bore for receiving the boring bar, the 0.072" range of adjustment would overlap the 0.0625" difference in boring bar diameters and accommodate a tolerance of plus or minus 0.003" in the insert cutting point position with assurance of complete coverage over the entire range. By providing the detachable dial collar 21 which can be interchangeably installed on each of the individual boring bars costs of manufacturing the complete set are further minimized.

With reference to FIGS. 2 to 4 a somewhat modified form of the offset boring tool is disclosed. In such modification the longitudinal slot 25 is limited in extent to the transverse slot 26 which extends to the center line of the bore 27. The slots are preferably filled with a resilient silicone polymer compound to keep dirt and debris from entering. A tapped hole 28 is provided in the socket 29 for a plunger retaining screw 30 adapted to engage a V-groove 31 in the retained end 32 of the boring bar 33 as illustrated in FIG. 4 (shown in larger scale relative to FIGS. 2 and 3). The inner end of the bar is relieved at 34 to a depth appropriate for engagement by a pin 35 seated in the socket and projected into the bore 27. Such pin controls and limits the adjustment segment for the insert end 36 of the boring bar relative to the coordinated semi-circular arc 37 for which graduations are provided on the beveled face 38 at the outer extremity of the socket. Adjacent thereto an integral collar 39 provided on the boring bar has an outer diameter equal to the inner diameter of the beveled dial and has a scribe mark, not illustrated, for alignment with the graduation marks of the dial. The 26 increments are progressively spaced as required to correspond with 0.005" increments in boring diameter with a 0.0325"

offset 39 providing a 0.130" total adjustment. The foregoing adjustment range and graduations are of course simply a specific example typical of a practical application. If the offset were reduced to 0.0065" a total adjustment range of 0.026" would result and each graduation would represent 0.001 of an inch adjustment in boring diameter. Thus, any required degree in precision of adjustment of boring diameter may be achieved through selection of an appropriate offset.

Again, as emphasized above the provision of a simple two-piece boring tool with a removable graduated collar as employed as in FIG. 1 provides a highly economical and practical way to manufacture sets of boring tools covering a desired range of bore diameters. The split socket construction with clamping deflection limited to two quarter segments of the boring head socket assures a three line engagement of the boring bar forcing it positively against the boring wall opposite the longitudinal slot with repeatable precision characteristic of positive solid registration, and avoids the prior art complexity of preloaded ball bearings. It also provides more reliable lost motion-free clamping against rotational displacement of the boring bar in operation as compared with spring loaded frictional tensioning means, or key or spline fits as employed in prior art constructions.

What I claim:

1. An adjustable boring tool comprising an axially extending shank, an integral socket extending from one end of said shank having a cylindrical bore with an axis parallel and offset relative to the axis of said shank, a transverse slot extending through a wall of said socket intersecting said bore and a longitudinal slot extending through one side of said socket wall from the end thereof to an intersection with an intermediate portion of said transverse slot, a cylindrical boring bar having a rotationally adjustable fit within said cylindrical bore, and means for clamping the slotted segments of said socket wall against said cylindrical boring bar in adjusted position.

2. An adjustable boring tool as set forth in claim 1 including as said means for clamping a transverse screw extending through said longitudinal slot, a shouldered aperture in one and a threaded aperture in the other of said slotted segments engaged respectively by headed and threaded portions of said screw.

3. An adjustable boring tool as set forth in claim 1 or 2 wherein said transverse slot extends substantially to the center line of said socket bore.

4. An adjustable boring tool as set forth in claim 1 or 2 wherein said transverse slot extends substantially to the center line of said socket bore, and said longitudinal slot intersects the center of said transverse slot.

5. An adjustable boring tool as set forth in claim 1 or 2 wherein said transverse slot extends substantially to the center line of said socket bore, and said longitudinal slot extends in an axial plane which intersects the center of said transverse slot.

6. An adjustable boring tool as set forth in claim 1 including calibrated means for accurately gauging the adjustment of relative rotational position between said boring bar and socket.

7. An adjustable boring tool as set forth in claim 4 wherein said calibrated means includes a removable gauge ring on said boring bar.

8. An adjustable boring tool as set forth in claim 1 including a plurality of interchangeable boring bars constructed for incremental cutting radii providing an enlarged composite continuous range of adjustment.

9. An adjustable boring tool as set forth in claim 1 including a plurality of interchangeable boring bars constructed for incremental cutting radii providing an enlarged composite continuous range of adjustment with overlapping individual extremities.

* * * * *